United States Patent
Smith et al.

(10) Patent No.: US 6,877,036 B1
(45) Date of Patent: *Apr. 5, 2005

(54) SYSTEM AND METHOD FOR MANAGING CONNECTIONS BETWEEN A CLIENT AND A SERVER

(75) Inventors: Jack J. Smith, Saratoga, CA (US); Richard T. Burright, San Jose, CA (US); W. Spencer Worley, III, Half Moon Bay, CA (US); Eoin B. MacDonell, Sunnyvale, CA (US); John A. Vastano, Santa Clara, CA (US); William T. Weatherford, San Mateo, CA (US)

(73) Assignee: Akamba Corporation, Saratoga, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/405,608

(22) Filed: Sep. 24, 1999

(51) Int. Cl.[7] .............................................. G06F 15/16
(52) U.S. Cl. ........................ 709/227; 709/202; 709/203
(58) Field of Search .................. 710/27, 310; 709/227, 709/228, 203, 217, 202

(56) References Cited

U.S. PATENT DOCUMENTS

| | | | |
|---|---|---|---|
| 5,550,981 A | 8/1996 | Bauer et al. ................ | 709/220 |
| 5,642,482 A | 6/1997 | Pardillos ..................... | 709/222 |
| 5,678,007 A | 10/1997 | Hurvig ........................ | 709/227 |
| 5,754,774 A | 5/1998 | Bittinger et al. ............ | 709/203 |
| 5,832,512 A | 11/1998 | Mastors et al. ............. | 707/202 |
| 5,852,717 A | 12/1998 | Bhide et al. ................ | 709/203 |
| 5,867,650 A | 2/1999 | Osterman ................... | 709/203 |
| 5,867,652 A * | 2/1999 | Hurvig ........................ | 370/394 |
| 5,872,919 A | 2/1999 | Wakeland ................... | 709/230 |
| 5,878,213 A * | 3/1999 | Bittinger et al. ............ | 709/203 |
| 5,896,508 A | 4/1999 | Lee ............................. | 709/220 |
| 5,898,830 A | 4/1999 | Wesinger, Jr. et al. ...... | 713/201 |
| 5,903,763 A * | 5/1999 | Takahashi ................... | 710/200 |
| 5,924,116 A | 7/1999 | Aggarwal et al. .......... | 711/122 |
| 5,935,249 A * | 8/1999 | Stern et al. .................. | 128/899 |
| 5,941,988 A | 8/1999 | Bhagwat et al. ............ | 713/201 |
| 5,974,496 A | 10/1999 | Miller ......................... | 710/128 |
| 6,014,695 A | 1/2000 | Yamashita et al. .......... | 709/219 |
| 6,072,483 A | 6/2000 | Rosin et al. ................. | 345/335 |
| 6,094,699 A * | 7/2000 | Surugucchi et al. ........ | 710/314 |
| 6,104,716 A | 8/2000 | Crichton et al. ............ | 370/401 |
| 6,115,755 A * | 9/2000 | Krishan ....................... | 709/250 |
| 6,119,161 A | 9/2000 | Lita et al. .................... | 709/227 |
| 6,122,514 A | 9/2000 | Spaur et al. ................. | 455/448 |
| 6,138,162 A | 10/2000 | Pistriotto et al. ............ | 709/229 |
| 6,182,141 B1 * | 1/2001 | Blum et al. ................. | 709/227 |
| 6,185,598 B1 * | 2/2001 | Farber et al. ............... | 709/200 |
| 6,308,238 B1 * | 10/2001 | Smith et al. ................. | 710/310 |
| 6,324,582 B1 * | 11/2001 | Sridhar et al. .............. | 709/228 |
| 6,330,605 B1 * | 12/2001 | Christensen et al. ........ | 709/226 |
| 6,389,462 B1 * | 5/2002 | Cohen et al. ................ | 709/218 |
| 6,553,422 B1 * | 4/2003 | Nelson ......................... | 709/227 |
| 6,567,857 B1 * | 5/2003 | Gupta et al. ................. | 709/238 |
| 2002/0049840 A1 * | 4/2002 | Squire et al. ................ | 709/225 |

OTHER PUBLICATIONS

Marco Pistoia, "Web Caching and Filtering with IBM Web Sphere Performance", Mar. 1999.*

(Continued)

*Primary Examiner*—William C. Vaughn, Jr.
(74) *Attorney, Agent, or Firm*—Henneman & Saunders; Larry E. Henneman, Jr.

(57) ABSTRACT

An adapter card for managing connections between clients and a network server off-loads the connection management burden from the server. The adapter card includes a memory with an embedded proxy application and a communication protocol stack, a processing unit for executing the application code, a network controller for interfacing with an internetwork, and a bus protocol bridge for interfacing with the internal bus of the network server. The proxy application receives client requests on behalf of the server over relatively slow and unreliable network connections, and submits the requests to the server over fast, reliable bus connections.

38 Claims, 8 Drawing Sheets

OTHER PUBLICATIONS

Ari Luotonen, "Web Proxy Servers", Copyright 1998.*

Luotonen, Ari. *Web Proxy Servers.* Prentice Hall PTR, Upper Saddle River, NJ. Copyright 1998. pp. 17–28, 325–343.

Luotonen, Ari, *Web Procy Servers.* Prentice Hall PTR, Upper Saddle River, NJ, Copyright 1998, pp. 3–16.

IBM TDB, "Generating Specific Server Programs in Distributed Object–Oriented Customer Information Control System," Jan. 1995, vol. 38, No. 1, pp. 411–414.

Scheifler et al., "The X Window System," ACM Transactions on Graphics, vol. 5, No. 2, Apr. 1986, pp. 79–109.

Mogul, J. C., "The Case for Persistent–Connection HTTP," Proceedings of the Conference on Applications, Technologies, Architectures, & Protocols for Computer Comm., 1995, pp. 299–313.

Cheriton, David R., "VMTP: A Transport Protocol for the Next Generation of Communication Systems," Proceeding, ACM SIGCOMM Conf. on Communications Architecture & Protocols, 1986, pp. 406–415.

Goldszmidt et al., "Scaling Internet Services by Dynamic Allocation of Connections," Integrated Network Management, 1999, Proceedings, $6^{th}$ IFIP/IEEE Int. Sym. on, pp. 171–184.

Kant et al., "Server Capacity Planning for Web Traffic Workload, Knowledge and Data Engineering," IEEE Transactions on, vol. 11 No. 5, Sep.–Oct. 1999, pp. 731–747.

Lin et al., "Speech Communication for Working Group Based on LAN," Communications, 1999, APCC/OECC 1999, $5^{th}$ APC and $4^{th}$ Optoelectronics and Communications Conference, vol. 2, 1999, pp. 880–883.

Cohen et al., "Connection Caching," Proceedings of the 31st Annual ACM Symposium on Theory of Computing, 1999, pp. 612–621.

* cited by examiner

SYSTEM AND METHOD FOR MANAGING CONNECTIONS BETWEEN A CLIENT AND A SERVER

BACKGROUND OF THE INVENTION

1. Field of the Invention

This invention relates generally to network servers and more particularly to servers that host a large number of client connections. Even more particularly, the present invention relates to servers (e.g., internet web servers) which host a large number of relatively slow client connections.

2. Description of the Background Art

It is common for network file servers such as internet web servers to host a large number of relatively slow client connections. The large number of open connections places a substantial burden on the server central processing unit (CPU), just to manage the open connections. For example, managing the open connections on a loaded server can consume 30–40% or more of the CPU's operating capacity. This burden substantially reduces the percentage of CPU cycles available to perform the primary function of the server, i.e., providing data to clients.

The connection management burden on the server CPU degrades the performance of the server software routines and reduces the maximum number of client connections that can be open at one time. As a result, web-hosting companies must provide additional, redundant servers to serve an increased number of clients. The cost of acquiring and maintaining additional web servers is substantial.

Proxy servers perform some client connection management functions, and are known in the art. However, it is well-known and commonly accepted in the art that such proxy servers must be housed separately from the server, and thus must communicate with the server over relatively slow, error prone network connections which the server must manage. See for example, Ari Luotonen, *Web Proxy Servers* (Prentice Hall, 1997), which is incorporated herein by reference.

What is needed, therefore, is a system and method for relieving the server CPU of the connection management burden, thus allowing the server to more efficiently host an increased number of clients.

SUMMARY

The present invention overcomes the problems associated with the prior art by providing a system and method for managing connections between a plurality of clients and a server. The invention facilitates off-loading the connection management burden from the host CPU to an adapter card interposed between the network and the host bus.

The adapter card includes a network controller, a memory device, a processing unit, and a protocol adapter. The memory device provides storage for data and code. The code includes a proxy application that communicates with clients on the network via the network controller, and communicates with the server via the protocol adapter, which is coupled directly to the server bus.

When executed by the processing unit, the proxy application manages client connections by establishing network connections between the proxy application and clients via the network, and by establishing bus connections between the proxy application and the server via the server bus. Additionally, the memory device provides data buffering, which allows many network connections to be open with clients, while a relatively few bus connections are open to the server. In a particular embodiment, the proxy accumulates client data in the buffers from the large number of slow client connections, and then submits the client data to the server over the fast bus connections. Conversely, the proxy receives server data via the fast bus connections, temporarily stores the server data, and then forwards the server data to the clients via the slow client connections.

In a more particular embodiment, the code includes a communications protocol stack that is employed by the application proxy to communicate with the clients and the server. In an even more particular embodiment, the communications protocol stack is a Transmission Control Protocol/Internet Protocol (TCP/IP) stack.

In one embodiment, the server connections are opened only after the proxy determines that a complete client request has been received. The server connections are then closed after the proxy receives a response to the client request from the server. Optionally, a predetermined number of persistent server connections are opened at system start-up, and the proxy uses these persistent connections to communicate with the server.

The proxy application optionally includes a number of application specific proxies, including but not limited to an HTTP proxy, a security proxy, and/or a pass-through proxy. In a particular embodiment, a master process module of the proxy discerns an application identifier (e.g., a well known port number) form the client data, and invokes one or more of the application specific proxies corresponding to the value of the identifier.

BRIEF DESCRIPTION OF THE DRAWINGS

The present invention is described with reference to the following drawings, wherein like reference numbers denote substantially similar elements.

DETAILED DESCRIPTION

The present invention overcomes the problems associated with the prior art, by off-loading much of the connection management burden from the server's main processor with a proxy application run on a different processing unit. In the following description, numerous specific details are set forth (e.g., particular communications protocols, particular software and data structures, etc.) in order to provide a thorough understanding of the invention. Those skilled in the art will recognize, however, that the invention may be practiced apart from these specific details. In other instances, details of well known network components and programming practices (e.g., establishing connections via a communications protocol stack) have been omitted, so as not to unnecessarily obscure the present invention.

Figure 1:
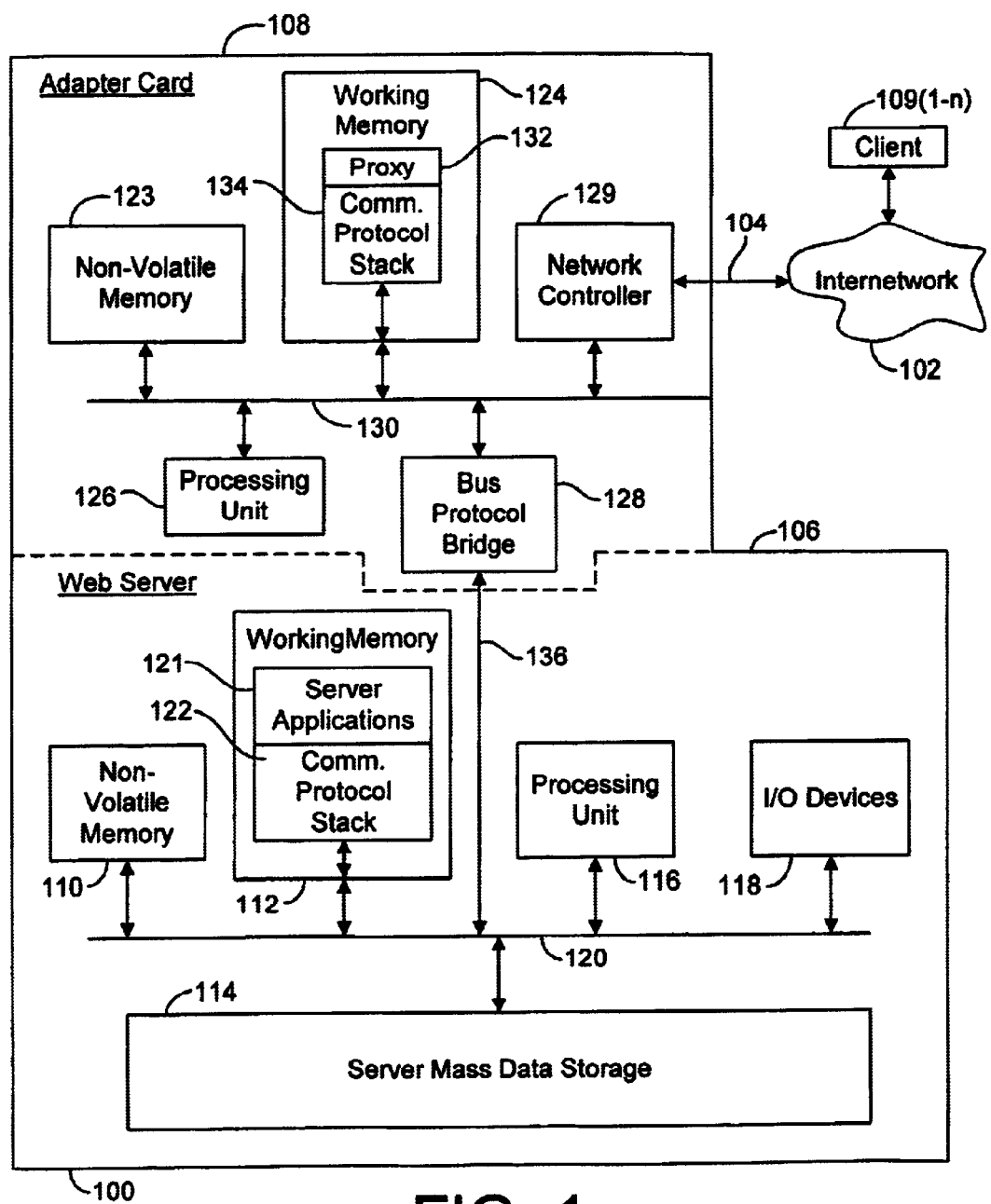
FIG. 1 is a block diagram of a server and an adapter card according to the present invention.

FIG. 1 is a block diagram showing a system 100 coupled to an internetwork 102 via a physical network media 104. In a particular implementation, system 100 is an internet web server, and internetwork 102 is the Internet, but those skilled in the art will recognize that the present invention may be implemented in any type of network server.

System 100 includes a file server (e.g., an HTTP web server) 106 and an adapter card 108. File server 106 provides data to and receives data from clients 109(1-$n$) on internetwork 102, via adapter card 108. Adapter card 108 establishes and maintains network connections between clients 109(1-$n$) and adapter card 108, and establishes bus connections between server 106 and adapter card 108. Thus connected, adapter card 108 receives communications from clients 109(1-$n$) on behalf of server 106, forwards the communications to server 106, receives responses from server 106 on behalf of clients 109, and forwards the responses to clients 109.

Server 106 includes non-volatile memory 110, working memory 112, server mass data storage 114, a processing unit 116, and one or more user input/output (I/O) devices 118, all intercommunicating via a server bus 120 (e.g., PCI bus). Non-volatile memory 110 (e.g., read-only memory and/or one or more hard-disk drives) provides storage for data and code which is retained even when server 106 is powered down. Working memory 112 (e.g., random access memory) provides operational memory for server 106, and includes executable code (e.g., an operating system) which is loaded into working memory 112 during start-up. Among other programs, working memory 112 includes server applications 121 and a communication protocol stack 122. Server applications 121 include network software applications (e.g., FTP, HTTP, etc.) which allow server 106 to function as a network server. Communications protocol stack 122 is a standard protocol stack (e.g., TCP/IP) which facilitates communication with other machines over an internetwork. Standard protocol stacks are well known in the art. See, for example, W. Richard Stevens, *TCP/IP illustrated, Vol. 1* (Addison-Wesley, 1994), which is incorporated herein by reference. Server mass data storage 114 provides data storage (e.g., one or more hard disk drives) for data (e.g., HTML pages, graphics files, etc.), which the server provides to clients 109(1-$n$) attached to internetwork 102. Processing unit 116 executes the instructions in working memory 112 to cause server 106 to carry out its primary function (e.g., providing data to and receiving data from clients). I/O devices 118 typically include a keyboard, a monitor, and/or such other devices which facilitate user interaction with server 106. Each of the above described components is typically found in a network server such as an internet web server.

Adapter card 108 includes non-volatile memory 123, working memory 124, a processing unit 126, a bus protocol bridge 128, and a network controller 129, all intercommunicating via an adapter bus 130. Non-volatile memory 123 provides storage for data and code (e.g., boot code) which is retained even when adapter 108 is powered down. Processing unit 126 imparts functionality to adapter card 108 by executing the code present in working memory 124. Bus protocol bridge 128 provides an interface between adapter bus 130 and server bus 120, and network controller 129 provides an interface between adapter bus 130 and network media 104.

Working memory 124 provides operational memory for adapter 108, and includes a proxy application 132 and a communication protocol stack 134. Proxy 132 and protocol stack 134 are loaded from non-volatile memory 123 into working memory 124 at start-up. Optionally, proxy 132 and protocol stack 134 can be loaded from one or more alternative sources, including but not limited to non-volatile memory 110 or server mass data storage 114 of server 106. Proxy 132, when executed by processing unit 126, establishes and manages the above described connections between adapter 108 and server 106 and between adapter 108 and clients 109.

In this particular embodiment of the invention, protocol stacks 122 and 134 are standard (e.g., TCP/IP) protocol stacks. Employing a standard communication protocol stack in adapter 108 facilitates the use of the standard communication software (e.g., protocol stack 122) already present in the vast majority of network servers. Those skilled in the art will recognize, however, that this particular element (as well as other described elements, even if not explicitly stated) is not an essential element of the present invention. For example, the present invention may be practiced with custom communication software (e.g., direct communication between server applications 121 and either protocol stack 134 or proxy 132) in both server 106 and adapter 108. Further, in particular embodiments of the invention, this element may be omitted by providing proxy 132 with direct access to the resources (e.g., server mass data storage 114) of server 106.

Adapter card 108 is coupled to server 106 via a bus connection 136 between bus protocol bridge 126 and server bus 120. In this particular embodiment, bus connection 136 is a typical bus expansion slot, for example a PCI slot. Those skilled in the art will recognize, however, that the present invention may be implemented with other types of bus connections, including but not limited to an ISA slot, a USB port, a serial port, or a parallel port. Bus connection 136 facilitates high speed, large packet size, relatively error free (as compared to network connections) communication between proxy 132 and server applications 121, greatly reducing the connection management burden on processing unit 116 of server 106. In summary, proxy 132 (running on processing unit 116) communicates with clients 109 over slow, error prone network connections, and then communicates with server applications 121 on behalf of clients 109 over high speed bus connection 136.

Figure 2:
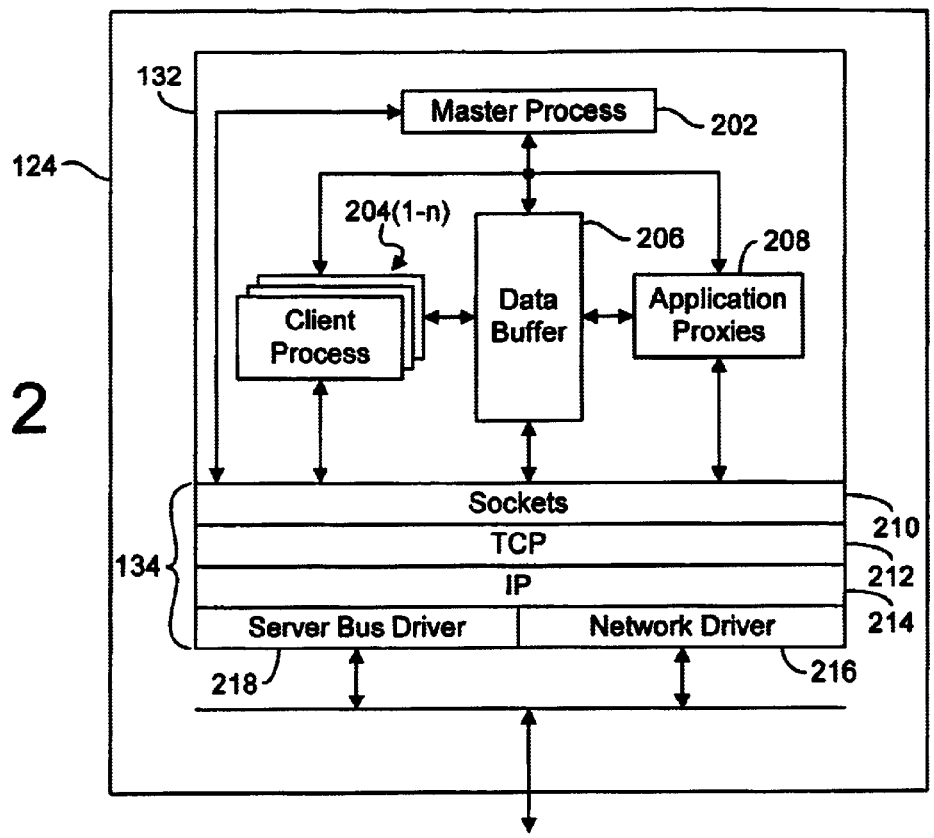
FIG. 2 is a block diagram of the working memory of the adapter card of FIG. 1, showing the proxy module in greater detail.

FIG. 2 is a block diagram of working memory 124 showing proxy 132 and protocol stack 134 in greater detail. Those skilled in the art will recognize that while the various software modules of proxy 132 are shown as interconnected functional blocks, the software modules are actually blocks of executable code stored in working memory 124 that can communicate with one another when executed by processing unit 126 (FIG. 1).

Proxy 132 includes a master process module 202, a plurality of client process modules 204(1-$n$), a data buffer 206, and an application proxies module 208. Master process module provides overall control and coordination of the various modules of proxy 132. Responsive to a connection request from a client 109 on internetwork 102 (FIG. 1) master process 202 accepts the connection request, initializes a data structure for that client connection in data buffer 206, initiates a new, separate client connection process 204 to handle the connection, and then notifies application proxies 208 that the particular client connection has been established. Each client process 204 handles one such client connection. Application proxies 208 establish and manage bus connections with server 106. Data buffer 206 provides storage for data received from clients 109 and destined for server 106, for data received from server 106 and destined for clients 109, and for connection data relating to established client and/or server connections.

Communications protocol stack 134 is a TCP/IP stack including a sockets layer 210, a TCP layer 212, an IP layer 214, and a device layer including a network driver 216 and a server bus driver 218. The functionality of each of the individual layers of protocol stack 134 is well known in the art, and will not, therefore, be discussed in detail herein. Connections between the various modules of proxy 132 and server applications 121 are established through sockets layer 210, TCP layer 212, IP layer 214 and server bus driver 218. Connections between the various modules of proxy 132 are established with clients 109 through sockets layer 210, TCP layer 212, IP layer 214 and network driver 216.

Figure 3:
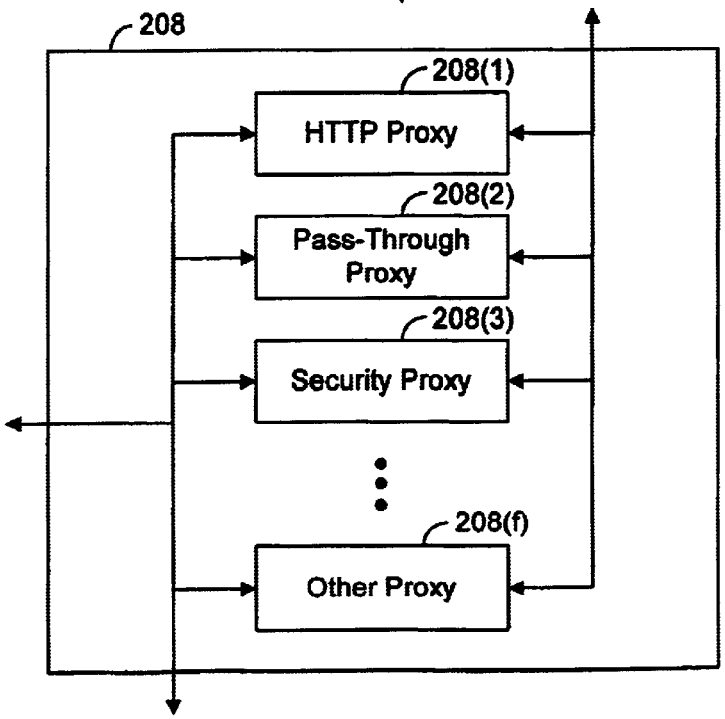
FIG. 3 is a block diagram showing the application proxies module of FIG. 2 in greater detail.

FIG. 3 is a block diagram showing application proxies module 208 to include a plurality of application specific proxies 203(1-$f$), including a hypertext transfer protocol (HTTP) proxy 208(1), a pass-through proxy 208(2), a security proxy 208(3), and an "other" proxy 208($f$). Master process 202 notifies application proxies 208 of an established client connection, by configuring one or more of the application specific proxies 208(1-$f$) to service the client connection. One means of configuring an application specific proxy (e.g., HTTP proxy 208(1)) is to enter a client process identifier in the processing queue of the application specific proxy.

Master process 202 determines which of the application specific proxies to implement for a particular client process from the port number included in the client connection request. It is standard practice to use well known port numbers to identify particular network applications and/or protocols (e.g., file transfer protocol (FTP), HTTP, etc.). For example, port number 80 corresponds to an HTTP connection request. Master process 202 therefore notifies HTTP proxy 208(1) of all client process' 204 initiated in response to a connection request indicating port 80.

HTTP proxy 208(1) monitors each of the client processes of which it is notified. When HTTP proxy 208(1) determines that a complete HTTP request is received and stored in data buffer 206 by a client process (e.g., 204($n$)), HTTP proxy 208(1) opens a connection to the server, transmits the request to the server, receives a response from the server, stores the response in data buffer 206 and then closes the server connection. The server response is then transmitted to client 109($n$) by the associated client process 204($n$).

When master process 202 receives a connection request with a port number that does not correspond to any of the other application specific proxies, master process 202 notifies pass-through proxy 208(2). Pass-through proxy 208(2) simply opens a server connection, transfers the data received from the associated client process 204 from data buffer 206 to server 106, and then closes the server connection.

Master process 202 may notify some application specific proxies of all client connections, regardless of the associated port number. For example, security proxy 208(3) is operative to screen all client connection requests by, for example, terminating any client process initiated in response to a connection request lacking some indicia of authorization, prior to implementing one of the other application specific proxies.

"Other" proxy 208($f$) is included in FIG. 3 to show that application proxies 208 can include any currently known or future developed proxy that is desirable for a particular application, including but not limited to, caching HTTP proxy applications, electronic mail applications, and file transfer applications.

Figure 4:
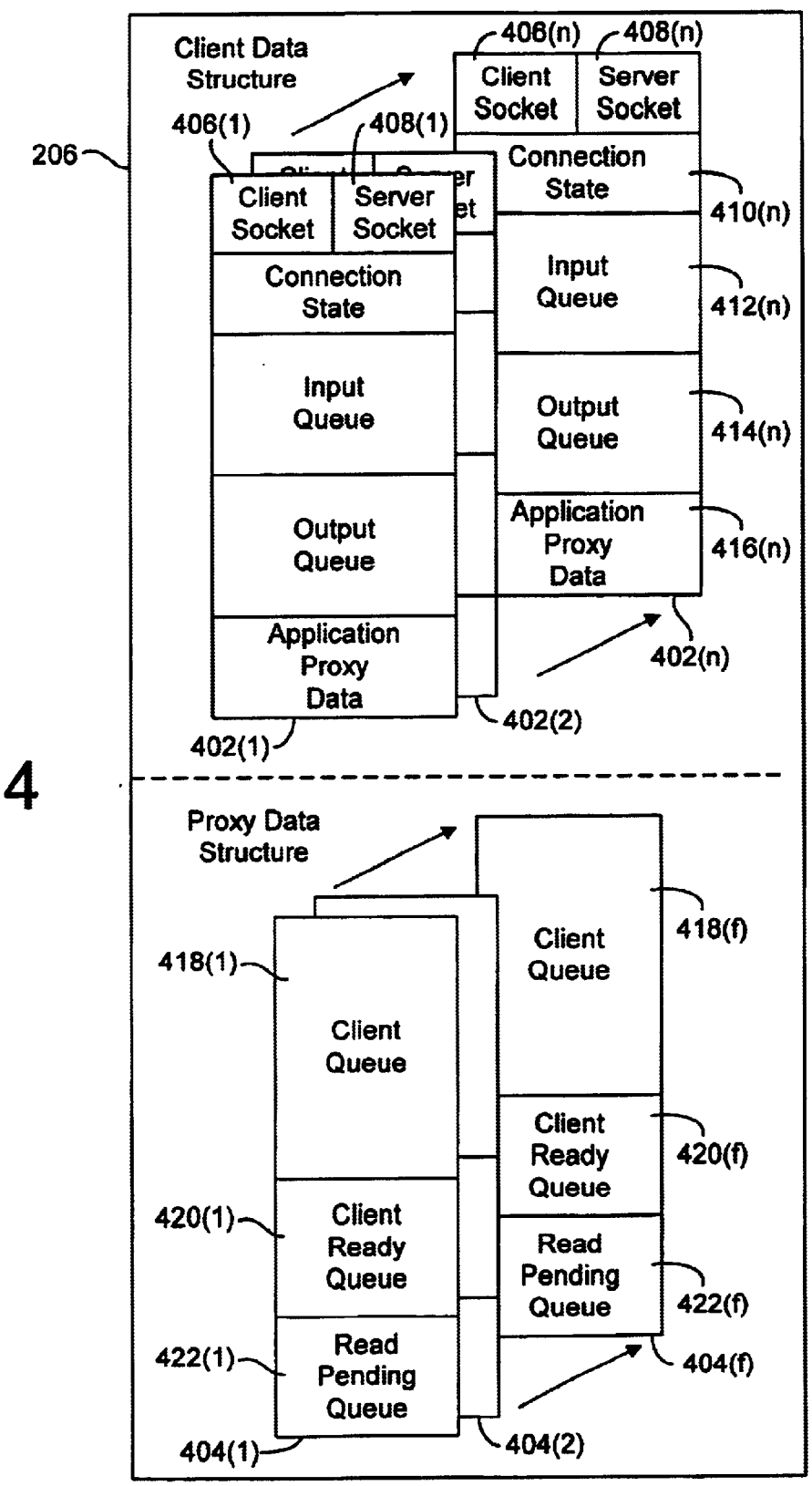
FIG. 4 is a block diagram showing exemplary data structures for at least some of the data stored in the data buffer of FIG. 2.

FIG. 4 shows an example of client data structures 402(1-$n$) and proxy data structures 404(1-$f$), implemented in data buffer 206 to effect the transfer of data through proxy 132. Master process 202 creates and initializes one client data structure 402 for each client process 204, and one proxy data structure 404 for each application specific proxy in application proxies 208.

Each client data structure 402 includes a client socket 406, a server socket 408, a connection state 410, an input queue 412, an output queue 414, and application proxy data 416. For each client connection (e.g., connection ($n$)), client socket 406($n$) and server socket 408($n$) each include the IP address and port number of the client 109($n$) and server 106, respectively, thus uniquely associating each client data structure 402($n$) with a single one of client processes 204($n$). Connection state 410($n$) indicates the current status (e.g., complete request received, response received, etc.) of the connection ($n$). Input queue 412($n$) is used to store and accumulate data received from client 109($n$) by the client process 204($n$) associated with the particular data structure 402($n$). Output queue 414($n$) is used to store data from application proxies 208 which is to be forwarded to client 109($n$) by client process 204($n$). Application proxy data 416($n$) is provided to store any information specific to a particular application proxy (e.g., flags, etc.).

Each proxy data structure (e.g., 404($f$)) includes a client queue 418($f$), a client ready queue 420($f$), and a read pending queue 422($f$). Client queue 418($f$) includes a client process descriptor (e.g., a pointer to a related client data structure 402) for each client process 204 associated with the particular application proxy ($f$) to which the proxy data structure 404($f$) corresponds. Client ready queue 420($f$) includes a client process descriptor for each client data structure 402 that has data in its input queue 412 that is ready to be processed (e.g., transferred to server 106) by the associated application proxy ($f$). Read pending queue 422($f$) includes the client process descriptor for each client process that is awaiting a response from server 106.

Those skilled in the art will understand that the above described client data structure 402 and proxy data structure 404 are exemplary in nature, and that other data structures may be employed with the present invention. The configuration of such alternate data structures will necessarily depend on the function and structure of the particular application specific proxies that are employed.

Figure 5:
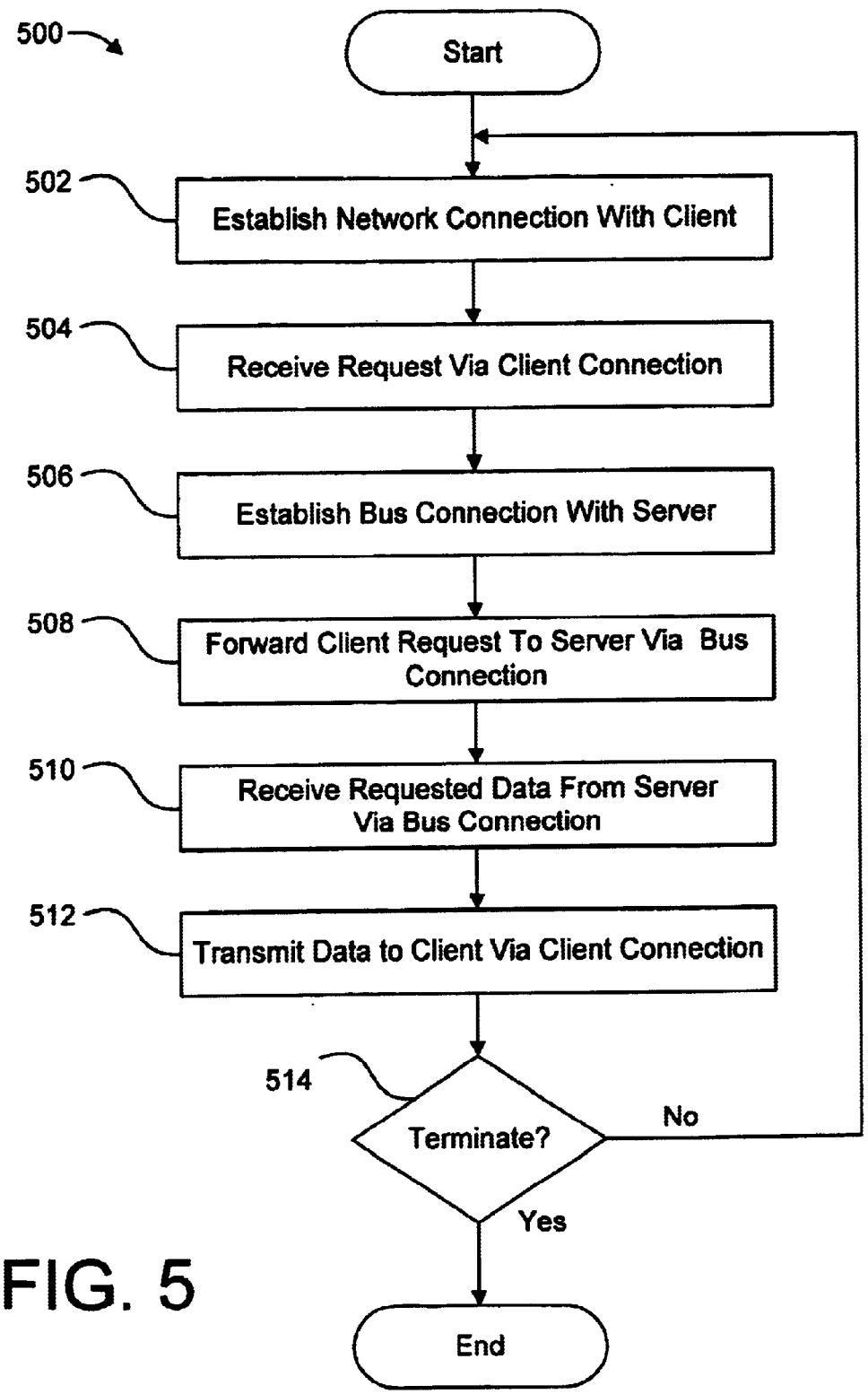
FIG. 5 is a flow chart summarizing one method for managing connections between a client and a server according to the present invention.

FIG. 5 is a flowchart summarizing a particular method 500 of managing connections between clients and a server according to the present invention. In a first step 502 proxy 132 establishes a network connection with a client 109, and then in a second step 504 receives a communication (e.g., an HTTP request) from client 109 via the network connection. Next, in a third step 506, proxy 132 establishes a bus connection with server 106, and then in a fourth step 508 forwards the received client communication to server 106 via the bus connection. Then, in a fifth step 510, proxy 132 receives a response (e.g., HTML data) to the client communication from server 106, and in sixth step 512 transmits the response to client 109 via the client network connection. Finally, in a seventh step 514, proxy 132 determines whether there is a signal to terminate (e.g., shut down), and if there is a signal to terminate, then method 500 ends. If there is no signal to terminate in seventh step 514, then-method 500 returns to first step 502, to establish a network connection with another client 109.

Figure 6:
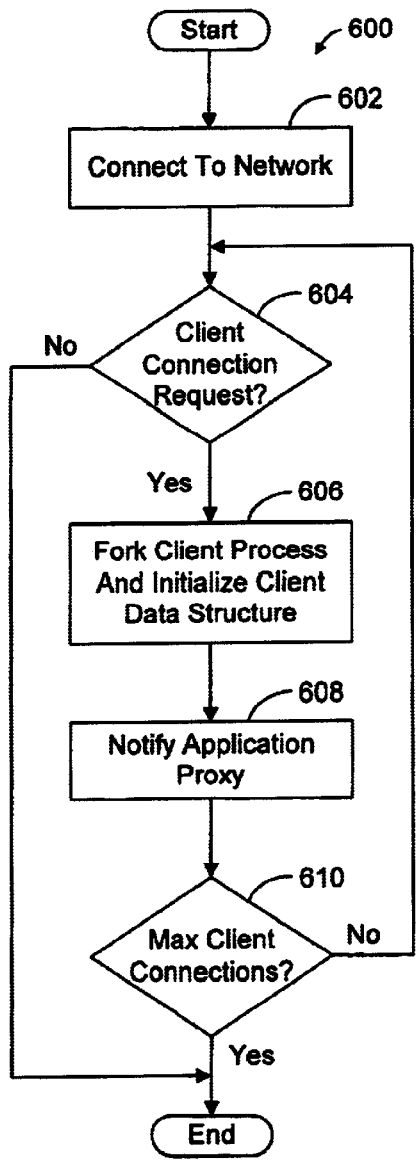
FIG. 6 is a flow chart summarizing one method for performing the first step of the method of FIG. 5.

FIG. 6 is a flow chart summarizing one particular method 600 of performing first step 502 (establishing a network connection with a client) of method 500. In a first step, master process 202 connects to internetwork 102. Then in a second step 604 master process 202 listens to the traffic on internetwork 102 to determine if there is a connection request from a client 109. If there is no client connection request, then method 600 ends. If there is a connection request from a client 109(n), then in a third step 606, master process 202 accepts the connection request form client 109(n), initiates a client process 204(n) to handle the connection, and initializes a client data structure 402(n) in data buffer 206. Next, in a fourth step 608, master process 202 discerns a proxy application identifier (e.g., a port number) from the client connection request and notifies one or more of application proxies 208(1-f), depending on the value of the identifier, by writing the client process descriptor (e.g., pointer to client data structure 402(n)) into the client queues 418 of the respective proxy data structures 404. Finally, in a fifth step 610, master process 202 determines whether the maximum allowed number of client connections are open. If the maximum number of client connections are open, then method 600 ends. If the maximum number of client connections are not open, then method 600 returns to second step 604, to listen for another connection request.

Figure 7:
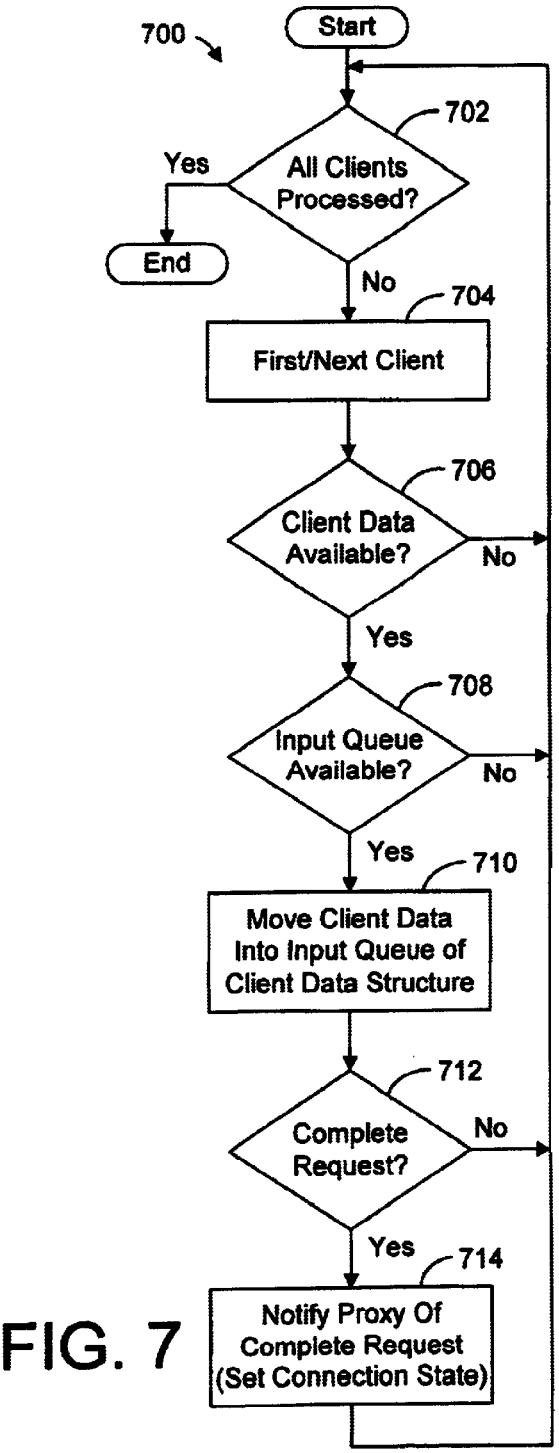
FIG. 7 is a flow chart summarizing one method for performing the second step of the method of FIG. 5.

FIG. 7 is a flow chart summarizing a method 700 of performing second step 504 (receiving a communication from a client 109) of method 500. In a first step 702, master process 202 determines whether there are any client processes 204 to be processed to receive data. If master process 202 has already processed all of client processes 204(1-n), then method 700 ends. If not, then in a second step 704, master process 202 calls the first client process 204(1). Then, in a third step 706, client process 204(1) checks its client connection (e.g., the TCP buffer) to determine whether there is any data coming in from client 109(1). If there is no incoming data for the first client process 204(1), then method 700 returns to first step 702 to process any remaining client processes 204(2-n). If, in third step 706, client process 204(1) determines that there is incoming data from client 109(1), then in a fourth step 708, client process 204(1) checks client data structure 402(1) to determine if input queue 412(1) is available to receive client data. If input queue 412(1) is not available, then method 700 returns to first step 702 to process any remaining client processes 204(2-n). If in fourth step 708, client process 204(1) determines that input queue 412(1) is available to receive data, then in a fifth step 710, client process 204(1) transfers the incoming client data into input queue 412(1). Then, in a sixth step 712, client process 204(1) determines whether the data accumulated in input queue constitutes a complete request (i.e., data ready to be transferred to server 106, for example a complete HTTP request). If the data does not constitute a complete request, then method 700 returns to first step 702 to process any remaining client processes 204(2-n). If, however, client process 204(1) determines in sixth step 712 that the data in input queue 412(1) constitutes a complete request, then, in a seventh step 714, client process notifies proxy applications 208 that there is a complete request by, for example, setting connection state 410(1) to so indicate. Then, method 700 returns to first step 702 to determine whether there are any more client processes 204(2-n) to process.

Figure 8:
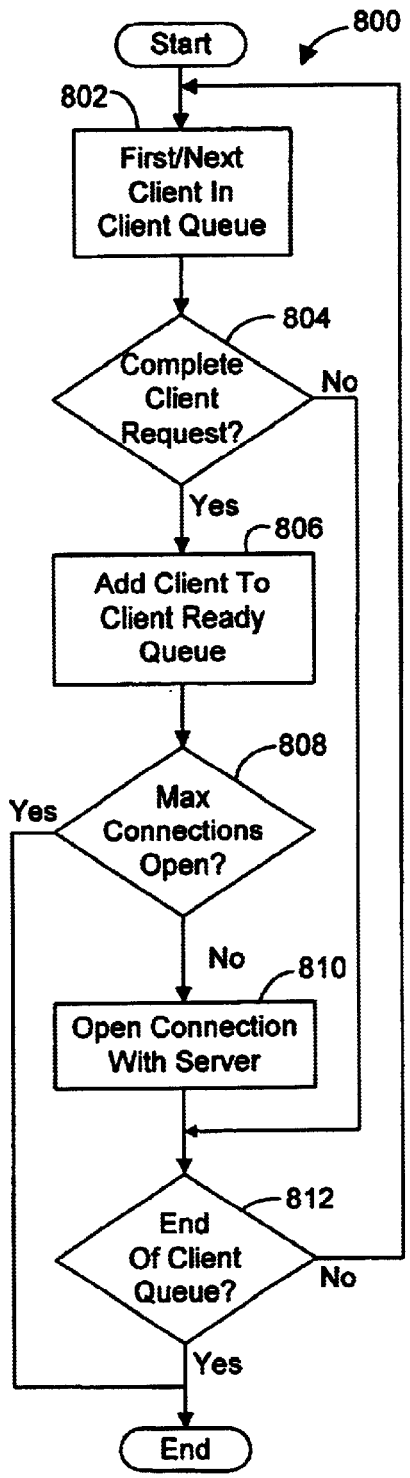
FIG. 8 is a flow chart summarizing one method for performing the third step of the method of FIG. 5.

FIG. 8 is a flow chart summarizing a method 800 of performing third step 506 (establishing a bus connection with server 106) of method 500. In a first step 802, a first one of application proxies 208(1) retrieves the first client descriptor from client queue 418(1) of its proxy data structure 404(1). Then in a second step 804, proxy 208(1) checks the connection state 412 of the client data structure 402 identified by the first client descriptor to determine if the first client has a complete request in its input queue 412. If connection state 412 indicates a complete request, then in a third step 806, proxy 208(1) adds the client descriptor to its client ready queue 420(1). Next, in a fourth step 808, proxy 208(1) determines whether the maximum number of connections to server 106 are open. If the maximum number of server connections are already open, then method 800 ends. If the maximum number of server connections are not already opened, then in a fifth step 810, proxy 208(1) opens a bus connection with server 106 and writes connection information in server socket 408 of the associated client data structure 402. Next, in a sixth step 812, proxy 208(1) determines whether it has checked the last client descriptor in its client queue 418(1). If the last descriptor has been checked, then method 800 ends. Otherwise, method 800 returns to first step 802 to retrieve the next descriptor in client queue 418(1). If, in second step 804, proxy 208(1) determines that a complete client request has not been received, then method 800 proceeds directly to sixth step 812. Once all of the descriptors in client queue 418(1) of proxy data structure 404(1) have been processed, method 800, or a similar method, is repeated for each of the other application proxies 208(2-f).

Figure 9:
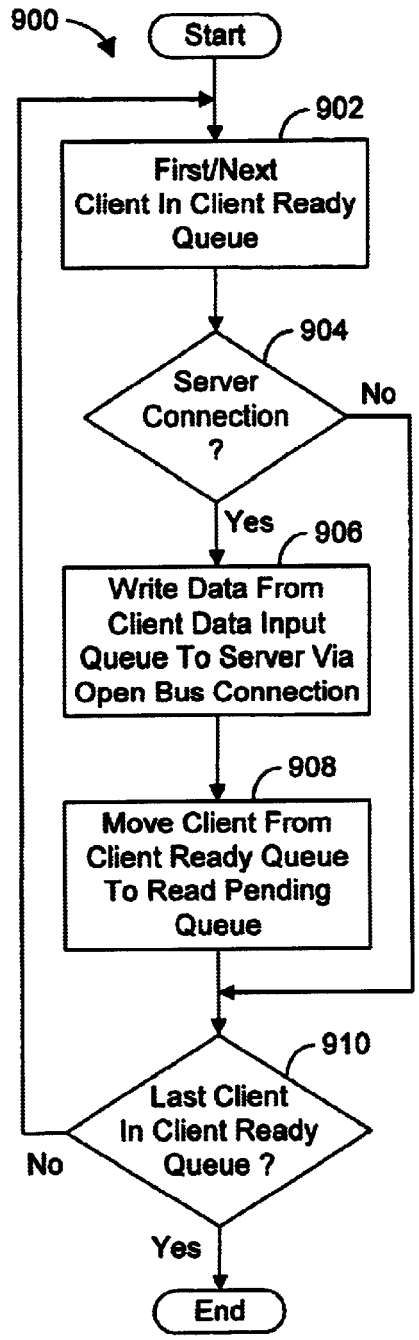
FIG. 9 is a flow chart summarizing one method for performing the fourth step of the method of FIG. 5.

FIG. 9 is a flow chart summarizing a method 900 of performing fourth step 508 (forwarding a client communication to server 106) of method 500. In a first step 902, proxy 208(1) retrieves the first client descriptor from the client ready queue 420(1) of its proxy data structure 404(1). Then, in a second step 904, proxy 208(1) checks the server socket 408 of the first client's data structure 402 to determine whether a server connection is open. If a server connection is open, then in a third step 906, proxy 208(1) transfers the client data (e.g., HTTP request) from the client input queue 412 to server 106 over the open server connection. Next, in a fourth step 908, proxy 208(1) moves the client descriptor from the client ready queue 420(1) to the read pending queue 422(1). Then in a fifth step 910, proxy 208(1) determines whether the last client in the client ready queue 420(1) has been checked. If not, then method 900 returns to first step 902 to check the next client in client ready queue 420(1). If the last client has been checked, then method 900 ends. If, in second step 904, proxy 208(1) determines that there is no server connection open for a particular client, then method 900 proceeds directly to fifth step 910 to determine whether the last client in the client ready queue 420(1) has been checked. Once all of the descriptors in client ready queue 420(1) of proxy data structure 404(1) have been processed, method 900, or a similar method, is repeated for each of the other application proxies 208(2-f).

Figure 10:
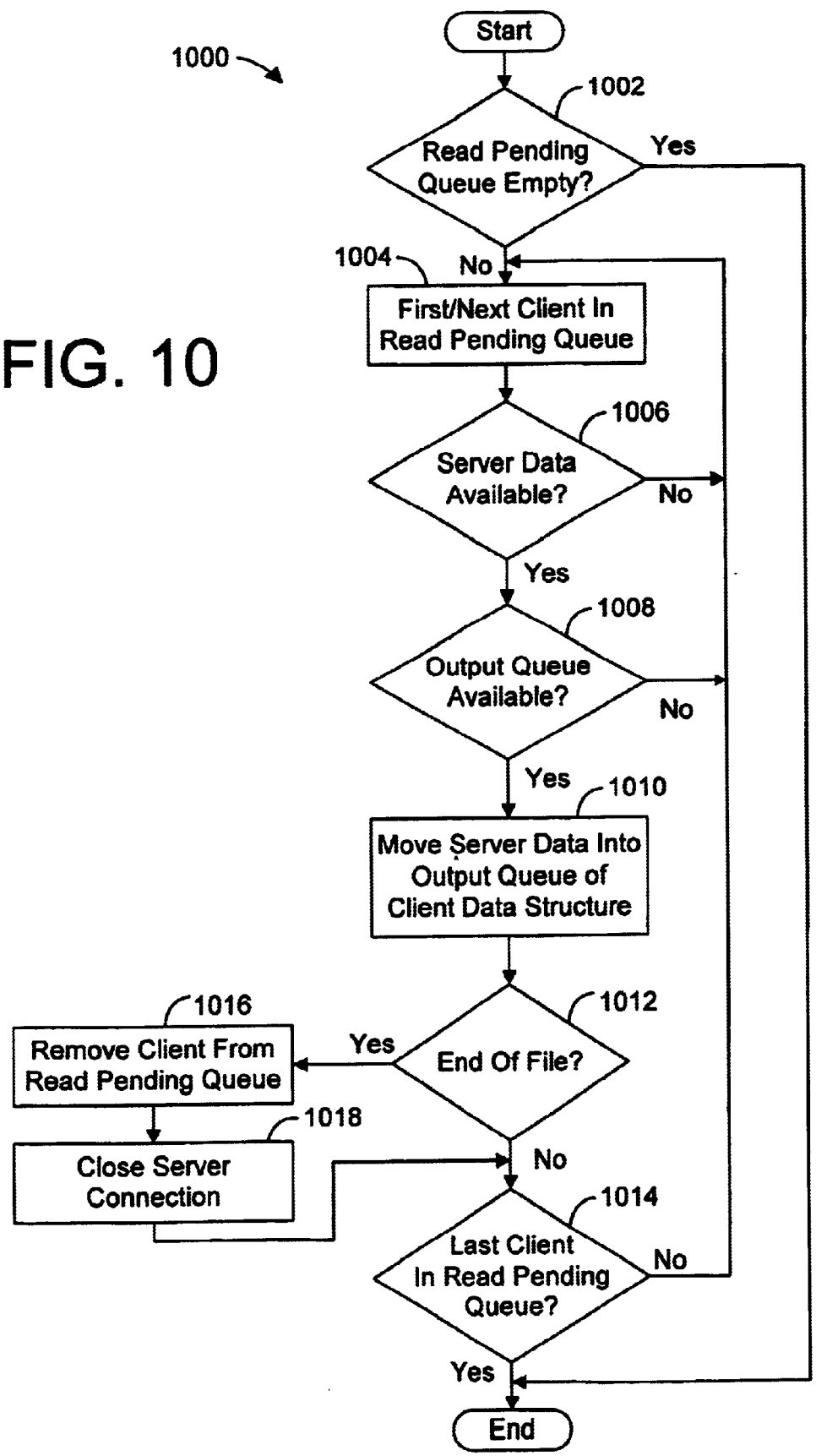
FIG. 10 is a flow chart summarizing one method for performing the fifth step of the method of FIG. 5.

FIG. 10 is a flow chart summarizing a method 1000 of performing fifth step 510 (receive hi a response from server 106) of method 500. In a first step 1002, proxy 208(1)

determines @0 whether read pending queue 422(1) is empty, and if so method 1000 ends. If read pending queue 422(1) is not empty, then in a second step 1004 proxy 208(1) retrieves the first client descriptor from the read pending queue. Next, in a third step 1006, proxy 208(1) checks the open server connection identified in server socket 408 of the client data structure 402 identified by the first client descriptor, to determine whether there is any incoming server data (i.e., a response to the client request) on that connection. If there is no incoming server data on that connection, then method 1000 returns to second step 1004 to check the next client in the read pending queue. If there is incoming server data, then in a fourth step 1008, proxy 208(1) checks to determine whether output queue 414 of the client data structure 402 identified by the client descriptor is available. If output queue 414 is not available, then method 1000 returns to second step 1004 to check the next client descriptor in read pending queue 422(1). If output queue 414 is available, then, in a fifth step 1010, proxy 208(1) moves the incoming server data into the output queue 414 of client data structure 402. Next, in a sixth step 1012, proxy 208(1) determines whether the server data includes an "end of file" indicator. If not, then in a seventh step 1014, proxy 208(1) checks to determine whether the last client descriptor in read pending queue 422(1) has been processed. If so, method 1000 ends. If not, method 1000 returns to step 1004 to read the next client descriptor from read pending queue 422(1).

If, in sixth step 1012, proxy 208(1) determines that the server data includes an end-of-file indicator, then method 1000 proceeds to an eighth step 1016, wherein proxy 208(1) removes the client descriptor from the read pending queue, and then in a ninth step 1018 closes the server connection. After ninth step 1018, method 1000 returns to seventh step 1014. Once all of the descriptors in read pending queue 422(1) of proxy data structure 404(1) have been processed, method 1000, or a similar method, is repeated for each of the other application proxies 208(2-f).

Figure 11:
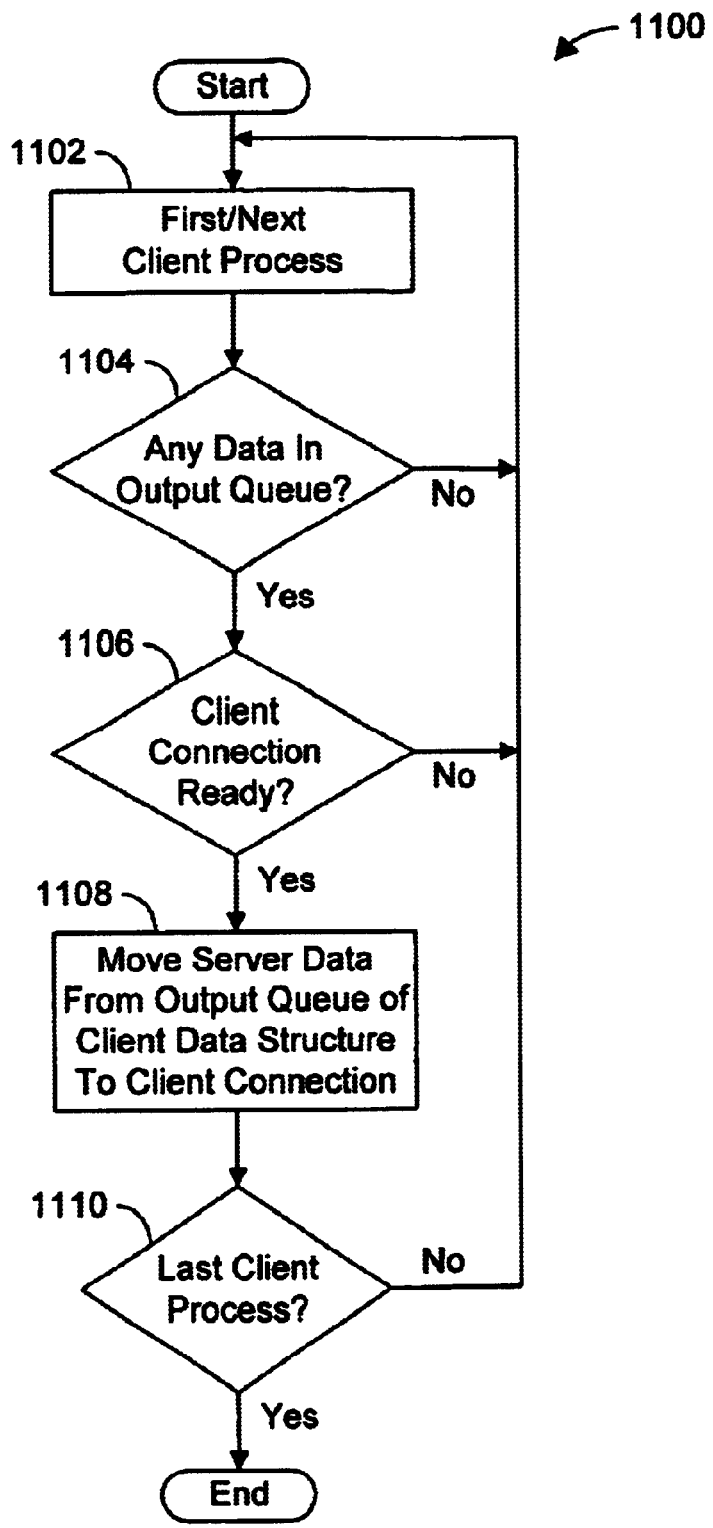
FIG. 11 is a flow chart summarizing one method for performing the sixth step of the method of FIG. 5.

FIG. 11 is a flow chart summarizing a method 1100 of performing sixth step 512 (transmitting data to clients 109) of method 500. In a first step 1102, master process 202 calls first client process 204(1). Then, in a second step 1104, first client process 204(1) determines whether there is any data in output queue 414(1) of client data structure 402(1). If there is no data in output queue 414(1), then method 1100 returns to first step 1102 where master process 202 calls the next of the remaining client processes 204(2-n). If, however, in second step 1104, client process 204(1) determines that there is data in output queue 414(1), then in a third step 1106, client process 204(1) determines whether the client network connection is ready to receive data. If the client network connection is not ready, then method 1100 returns to first step 1102. If the client network connection is ready, then in a fourth step 1108, client process 204(1) moves at least a portion of the data in output queue 414(1) to the client connection (e.g., the TCP output buffer). Next, in a fifth step 1110, master process 202 determines whether the last client process has been called. If so, method 1100 ends. If not, method 1100 returns to first step 1102 to call the next of the remaining client processes 203(2-n).

The description of particular embodiments of the present invention is now complete. Many of the described features may be substituted, altered or omitted without departing from the scope of the invention. For example, the operative components of adapter 108 (e.g., processing unit 126 and proxy 132) can be incorporated directly into a server instead of being provided in a removable adapter card. Further, alternate data structures may be substituted for the exemplary data structures provided. Additionally, the particular orders of methods and routines disclosed herein are not considered to be essential elements of the present invention. As yet another example, master process 202 can be configured to open a predetermined number of persistent bus connections with server 106 at start-up, and manage the use of those connections by application proxies 208(1-f), thus eliminating the need for server 106 to repetitively open and close the bus connections. These and other deviations from the particular embodiments shown will be apparent to those skilled in the art, particularly in view of the foregoing disclosure.

We claim:

1. In an interface device operatively coupled to an internal bus of an origin sender, a method for managing connections between at least one client and said origin server, said method comprising the steps of:

establishing a network connection with one of said clients via a network;

receiving a communication from said client via said network connection;

accumulating one or more separate transmissions from said client in a buffer;

establishing a bus connection with said origin server via an internal bus of said origin server after a complete client request is accumulated in said buffer;

forwarding said client communication to said origin server via said bus connection;

receiving a response to said client communication from said server via said bus connection; and forwarding said response to said client via said network connection.

2. A method according to claim 1, wherein said step of receiving said response from said server includes storing said response in a buffer.

3. A method according to claim 2, wherein mid step of receiving said response from said server includes terminating said bus connection after said response is received.

4. A method according to claim 1, wherein said client communication includes an HTTP request.

5. A method according to claim 4, wherein said response from said server includes an HTML page.

6. A method according to claim 1, wherein said step of establishing a network connection with a client includes establishing a separate network connection with each of a plurality of clients via said network.

7. A method according to claim 6, wherein said step of establishing said bus connection with said server includes establishing a plurality of connections with said server via said internal bus of said server.

8. A method according to claim 7, wherein the maximum number of simultaneous client connections exceeds the maximum number of simultaneous server connections.

9. A method according to claim 1, further comprising performing a security operation on said client communication prior to forwarding said client communication to said server.

10. A method according to claim 1, wherein:

said step of receiving said client communication includes discerning an application identifier from said client communication; and said step of forwarding said client communication to said server includes invoking one of a plurality of proxy applications based on said application identifier.

11. A method according to claim 10, wherein said application identifier is the connection port number.

12. A method according to claim 1, wherein said step of receiving said client communication includes receiving at least a portion of an HTTP request.

13. A computer readable medium having code embodied therein for causing an electronic device to perform the steps of claim 1.

14. A computer readable medium having code embodied therein for causing an electronic device to perform the steps of claim 2.

15. A computer readable medium having code embodied therein for causing an electronic device to perform the steps of claim 3.

16. A computer readable medium having code-embodied therein for causing an electronic device to perform the steps of claim 4.

17. A computer readable medium having code embodied therein for causing an electronic device to perform the steps of claim 5.

18. A computer readable medium having code embodied therein for causing an electronic device to perform the steps of claim 6.

19. A computer readable medium having code embodied therein for causing an electronic device to perform the steps of claim 7.

20. A computer readable medium having code embodied therein for causing an electronic device to perform the steps of claim 7.

21. A computer readable medium having code embodied therein for causing an electronic device to perform the steps of claim 9.

22. A computer readable medium having code embodied therein for causing an electronic device to perform the steps of claim 10.

23. A computer readable medium having code embodied therein for causing an electronic device to perform the steps of claim 11.

24. A computer readable medium having code embodied therein for causing an electronic device to perform the steps of claim 12.

25. An adapter card for operatively coupling to an internal bus of an origin server for managing origin server communication with a network, said adapter card comprising:
 a network controller for communicating with clients on said network;
 a memory-device for storing data and code, said code including a reverse proxy application;
 a processing unit coupled to said memory device for executing said code; and
 a protocol adapter coupled to said processing unit, and adapted to couple to said internal bus of said origin server, for communicating with said origin server; and wherein
 said reverse proxy application is operative to establish a network connection with a client on said network, to receive a communication from said client via said network connection to store said communication in said memory device by accumulating one or more separate transmissions from said client in said memory device, establishing a bus connection with said server after a complete client request is accumulated in said memory device, receiving a response to said client communication from said server via said bus connection, and forwarding said response to said client via said network connection.

26. An adapter card according to claim 25, wherein said code further comprises a communication protocol stack.

27. An adapter according to claim 26, wherein said communication protocol stack comprises a standard TCP/IP protocol stack.

28. An adapter card according to claim 25, wherein said proxy application includes a security proxy.

29. An adapter card according to claim 25, wherein said proxy application includes a pass-through proxy.

30. An adapter card according to claim 25, wherein said proxy application includes an HTTP proxy.

31. An adapter card according to claim 25, wherein said proxy application includes a master process module responsive to a connection request received from one of said clients, and operative to establish a connection with said client and to initiate a new client process module to maintain said established connection.

32. An adapter card according to claim 31, wherein said master process module is further operative to notify said proxy application of said established connection.

33. An adapter card for operatively coupling to an internal bus of an origin server for managing origin server communication with a network, said adapter card comprising:
 a network controller for communicating with clients on said network;
 a memory device for storing data and code, said code including a reverse proxy application and a master process module;
 a processing unit coupled to said memory device for executing said code; and
 a protocol adapter coupled to said processing unit, and adapted to couple to said internal bus of said origin server, for communicating with said origin server; and wherein
 said master process module is operative to discern an application identifier from a communication received from one of said clients and to invoke one of a plurality of proxy applications based on said application identifier.

34. An adapter card according to claim 3, wherein said application identifier is the connection port number.

35. In an interface device operatively coupled to an internal bus of an origin server, a method for managing connections between at least one client and said origin server, said method comprising the steps of:
 establishing a network connection with one of said clients via a network;
 receiving a communication from said client via said network connection;
 establishing a bus connection with said origin server via an internal bus of said origin server; and
 forwarding said client communication to said origin server via said bus connection; and wherein
 said step of receiving said client communication includes discerning an application identifier from said client communication; and
 said step of forwarding said client communication to said server includes invoking one of a plurality of proxy applications based on said application identifier.

36. A method according to claim 35, wherein said application identifier is the connection port number.

37. A computer readable medium having code embodied therein for causing an electronic device to perform the steps of claim 36.

38. A computer readable medium having code embodied therein for causing an electronic device to perform the steps of claim 35.

* * * * *

UNITED STATES PATENT AND TRADEMARK OFFICE
CERTIFICATE OF CORRECTION

PATENT NO. : 6,877,036 B1
DATED : April 5, 2005
INVENTOR(S) : Smith et al.

It is certified that error appears in the above-identified patent and that said Letters Patent is hereby corrected as shown below:

Column 10,
Line 35, delete "sender" and insert -- server -- in its place.
Line 37, delete "mid" and insert -- said -- in its place.

Column 11,
Line 24, delete "claim 7" and insert -- claim 8 -- in its place.
Line 54, insert -- , -- between "connection" and "to".

Column 12,
Line 37, delete "claim 3" and insert -- claim 33 -- in its place.

Signed and Sealed this

Eleventh Day of October , 2005

JON W. DUDAS
*Director of the United States Patent and Trademark Office*